United States Patent Office 3,488,462
Patented Jan. 6, 1970

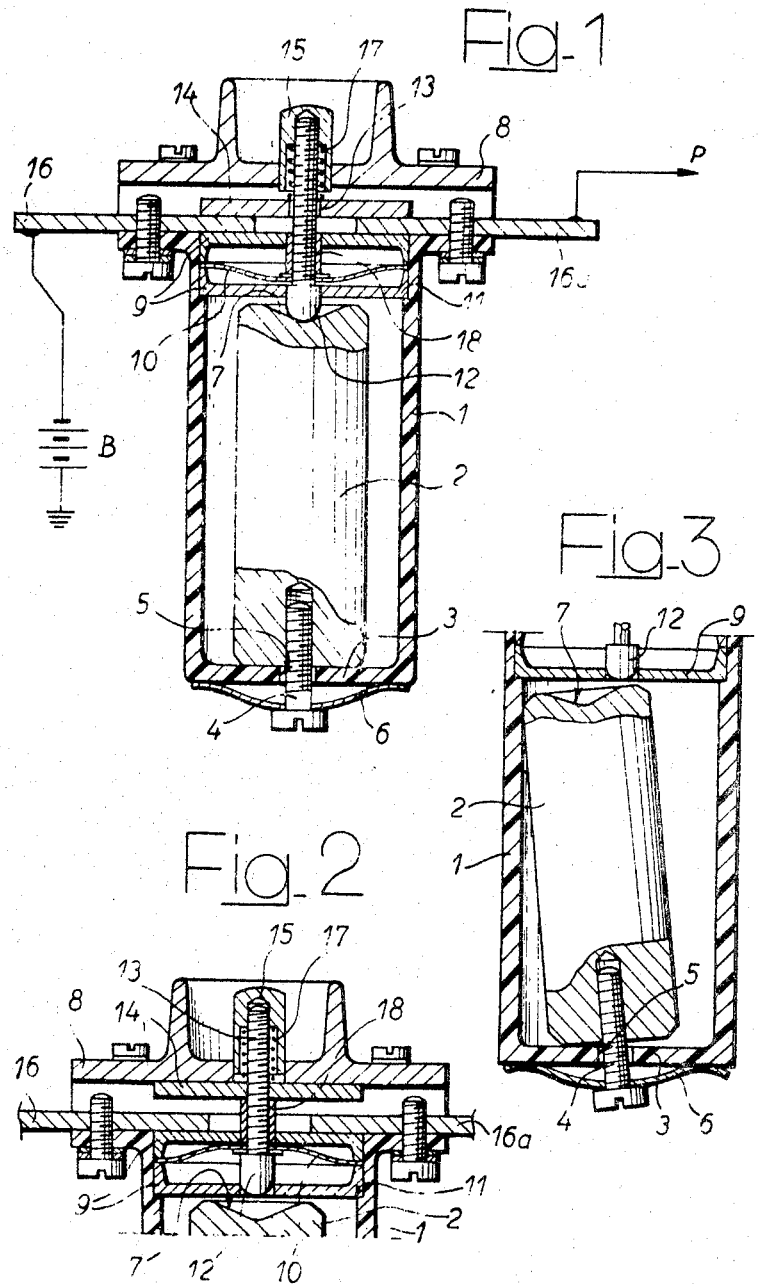

3,488,462
INERTIA ELECTRIC SWITCH
Pietro Gianotto, Turin, Italy, assignor to
Fiat Societa per Azioni, Turin, Italy
Filed Jan. 24, 1968, Ser. No. 700,203
Claims priority, application Italy, Jan. 28, 1967,
793,563
Int. Cl. H01h 35/02
U.S. Cl. 200—61.45       4 Claims

ABSTRACT OF THE DISCLOSURE

An inertial mass is resiliently held in its repose condition and is formed with a substantially conical camming surface cooperating with snap-acting means associated with the movable contact or contacts of the switch. In the open condition of the switch the snap-acting means is not influenced by the camming surface. A push-button is associated with the movable contact and snap-acting means for both manual restoration and manually controlled opening of the contacts.

BACKGROUND OF THE INVENTION

The invention relates to switches for protecting the electric plants on motor vehicles.

In order to avoid the danger of short-circuits in the event of an impact it is known to interpose between the electric battery and the electric equipment of a motor vehicle a mercury switch which is normally closed and opens under the action of strong impulsive forces.

The mercury switches which are currently employed for protecting the electric plants on motor vehicles are objectionable owing to their unreliability in operation due to the fact that, since mercury is readily movable, it is apt to casually resume after impact the position re-establishing the switch closing conditions.

Moreover, mercury switches respond to unidirectional shocks only and are arranged to act in the case of front impact while they are ineffective in the case of shocks in all other directions.

An object of the invention is to provide an inertia electric switch for protecting the electric plants on motor vehicles against the risk of short-circuits in the case of impact, which will respond to shocks in any horizontal direction.

A further object of the invention is to provide an inertia electric switch for protecting electric plants on motor vehicles, which would obviate the risk of casual reclosing.

A further object of the invention is to provide an electric protective switch operating by inertia which may, however, be hand actuated and may be moved to its closed or open position whenever desired.

DESCRIPTION OF THE INVENTION

With the above objects in view the invention provides an inertia electric switch having stationary contacts and a movable member carrying the movable contact or contacts, wherein the switch comprises spring means acting on the movable member in order to alternately maintain the latter in either end position for closing or opening the contacts, respectively, functioning by snap action on passing through a dead point during the displacement of the movable member from one to the other end position, and an inertial mass operatively associated with the movable member, adapted to generate under the action of an impact a force component capable of displacing the movable member from its contact closing to its contact opening position.

Further characteristic features and advantages of the invention will be understood from the appended detailed description referring to the accompanying drawings given by way of example only, wherein:

FIGURE 1 is an axial sectional view of an electric switch according to the invention in its closed condition;

FIGURE 2 is a detail view of FIGURE 1 showing the switch in its open condition;

FIGURE 3 is a detail view of FIGURE 1 showing the inertial mass in an unstable position resulting from an impact.

A tubular vertical casing 1 loosely encloses an inertia mass 2 of a cylindrical shape tiltable in the casing.

The lower planar end of the mass 2 bears on the inner face of the bottom of the casing 1 and is resiliently retained in this condition by an axial screw 4 extending through a central aperture 5 in the bottom of the casing and through an elliptical leaf spring 6 the opposite ends of which bear on the outer face of the bottom 3 so that the spring tends to withdraw the screw 4 from the aperture 5 causing the lower end face of the mass 2 to bear against the bottom 3.

The upper end face of the mass 2 is formed with a substantially conical central seat 7 providing camming means for the movable member of the switch.

The casing 1 is closed by a cover 8 bolted to the edge of the casing and retaining in the mouth of the casing against a rabbet 11 a pair of opposing cups 9 with a spring disc 10 of steel sheet clamped between the opposed circumferential edges of the cups.

The disc 10 is centrally bulged and is provided on its side turned towards the bottom 3 of the casing 1 with a cam follower 12 having a rounded head turned towards the seat 7 in the mass 2.

In the position shown in FIG. 1 the disc 10 turns its convexity towards the bottom 3 and the cam follower 12 centrally contacts the seat 7. The cam follower actually consists of a head section of an axially arranged bolt 13 projecting from the side of the disc 10 opposite its side turned towards the bottom 3 of the casing 1 and freely extending through a metal bridgepiece 14 acting as movable contact in the switch, the bolt 13 being secured to the disc by any convenient means, such as by riveting the head 12.

The free end of the rod 13 has screwed thereon a cylindrical push-button 15 guided in and outwardly protruding from the cover 8.

The two ends of the movable contact 14 are turned towards and superpose on two fixed contact plates 16, 16a laterally extending from diametrically opposite sides of the cover 8 and secured to the latter, connected to the battery B and to the electric plant P on the vehicle, respectively.

A helical spring 17 is interposed between the push button 15 and movable contact 14 and urges the contact 14 against the contacts 16, 16a.

A spacer sleeve 18 surrounds the end section of the rod 13 secured to the disc 10. In the position shown in FIGURE 1 the sleeve 18 is axially spaced by a small extent from the movable contact 14 so that the latter may be pressed by the spring 17 against the stationary contacts 16, 16a.

An impact of sufficient strength will tilt the mass 2 from its axially directed position shown in FIG. 1 to an unstable position shown in FIG. 3, whereby the cam follower 12 will be axially displaced by the camming action of the seating 7 on the rounded head of the cam follower.

On its displacement the cam follower 12 deforms the disc 10 which, on reaching beyond the planarity dead point, snappingly reverses its configuration till its convexity is turned towards the movable contact 14 as shown in FIGURE 2. On reaching this position the sleeve 10 axially engages the movable contact 14 and removes it from the stationary contacts 16, 16a, whereby the circuit is opened and the cam follower 12 is withdrawn from the seating 7 (FIG. 3) thereby leaving the mass 2 free.

The mass 2 may be thus readily returned by its return spring 6 to its inoperative position, in which the seating 7 again results coaxial with the cam follower 12 which is, however, kept spaced from the seating by the snapped disc 10. Any subsequent impact would, therefore, leave the position of the contacts unaltered and the electric circuit will remain open.

In this condition, by manually depressing the push button 15, the disc 10 is caused to snap to the condition shown in FIG. 1, whereby the cam follower 12 engages into the seat 7 and the closed position of the switch is restored.

Manual opening of the switch is effected by pulling the push button 15 outwardly till the disc 10 snaps beyond its dead point.

What I claim is:

1. An inertia electric switch comprising: a stationary contact, a movable member carrying a movable contact, a casing, an inertial mass controlling said movable member, a centrally bulged sheet-metal disc spring having its circumferential edge stationary with respect to the casing and a bolt operatively connected with the movable member and an end section centrally secured to the disc, the spring disc acting on the movable member to alternately maintain the movable member in either a contact opening or contact closing position by snap action on displacement of the movable member from one to the other of the positions; and the inertial mass operatively associated with the movable member, to supply under an impact a force component capable of displacing the movable member from the position closing the contacts to the position opening the contacts.

2. The inertia electric switch as claimed in claim 1 wherein the disc is provided with a cam follower having a rounded head on the side of the disc opposite the bolt, and wherein the inertial mass is formed with a substantially conical seat providing a camming surface for the cam follower, said mass being tiltable in the casing.

3. The inertia electric switch as claimed in claim 2, wherein the mass is resiliently fixed in the casing in a position such that the seat is coaxial with the cam follower.

4. The inertia electric switch as claimed in claim 1 wherein the bolt extends outwardly from the switch casing and a push-button is provided on the protruding end of the bolt for manual actuation of the switch.

References Cited

UNITED STATES PATENTS

| 2,236,872 | 4/1941 | Grigsby | 200—61.5 |
|---|---|---|---|
| 2,415,086 | 2/1947 | Detwiler | 200—61.52 |
| 2,806,914 | 9/1957 | Tedder | 200—61.45 |
| 3,066,202 | 11/1962 | Kaleba et al. | 200—61.52 |
| 3,198,899 | 8/1965 | Hitchcock | 200—61.45 |

FOREIGN PATENTS

| 768,775 | 8/1934 | France. |
|---|---|---|
| 756,448 | 9/1956 | Great Britain. |

HERMAN O. JONES, Primary Examiner